(12) United States Patent
Parkyn et al.

(10) Patent No.: US 7,273,299 B2
(45) Date of Patent: Sep. 25, 2007

(54) CYLINDRICAL IRRADIANCE-MAPPING LENS AND ITS APPLICATIONS TO LED SHELF-LIGHTING

(75) Inventors: William A. Parkyn, Lomita, CA (US); David G. Pelka, Los Angeles, CA (US)

(73) Assignee: Pelka & Associates, Los Angeles, CA (US)

(*) Notice: Subject to any disclaimer, the term of this patent is extended or adjusted under 35 U.S.C. 154(b) by 0 days.

(21) Appl. No.: 11/332,738

(22) Filed: Jan. 17, 2006

(65) Prior Publication Data

US 2006/0164833 A1 Jul. 27, 2006

Related U.S. Application Data

(60) Provisional application No. 60/646,617, filed on Jan. 26, 2005.

(51) Int. Cl.
*F21V 5/00* (2006.01)
(52) U.S. Cl. ............... 362/244; 362/246; 362/335; 362/249
(58) Field of Classification Search ............... 362/235, 362/240, 244, 246, 335–338, 340, 555, 800, 362/311, 217–225, 307–310, 326, 249, 278, 362/320, 334
See application file for complete search history.

(56) References Cited

U.S. PATENT DOCUMENTS

| | | | | |
|---|---|---|---|---|
| 4,698,730 A | * | 10/1987 | Sakai et al. | 362/311 |
| 4,734,836 A | * | 3/1988 | Negishi | 362/311 |
| 6,361,186 B1 | * | 3/2002 | Slayden | 362/249 |
| 6,834,979 B1 | * | 12/2004 | Cleaver et al. | 362/219 |
| 7,011,421 B2 | * | 3/2006 | Hulse et al. | 362/84 |

* cited by examiner

*Primary Examiner*—Sandra O'Shea
*Assistant Examiner*—Bao Q. Truong
(74) *Attorney, Agent, or Firm*—William W. Haefliger

(57) ABSTRACT

A cylindrical irradiance-redistribution lens is positioned over a line of LEDs, and is shaped to redistribute their light for uniformly illuminating a nearby planar target, such as shelves, signs, or walls. The lens shape is calculated via matching the cumulative lateral flux functions of the line of LEDs with that of the uniformly illuminated planar target. Numerous preferred embodiments are disclosed for a variety of illumination geometries.

18 Claims, 12 Drawing Sheets

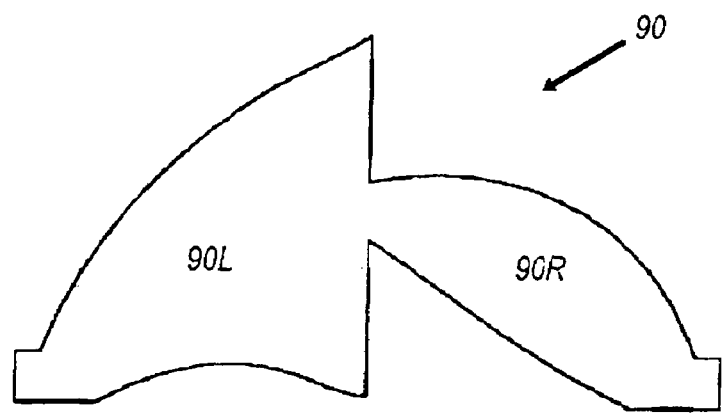
FIG. 9A
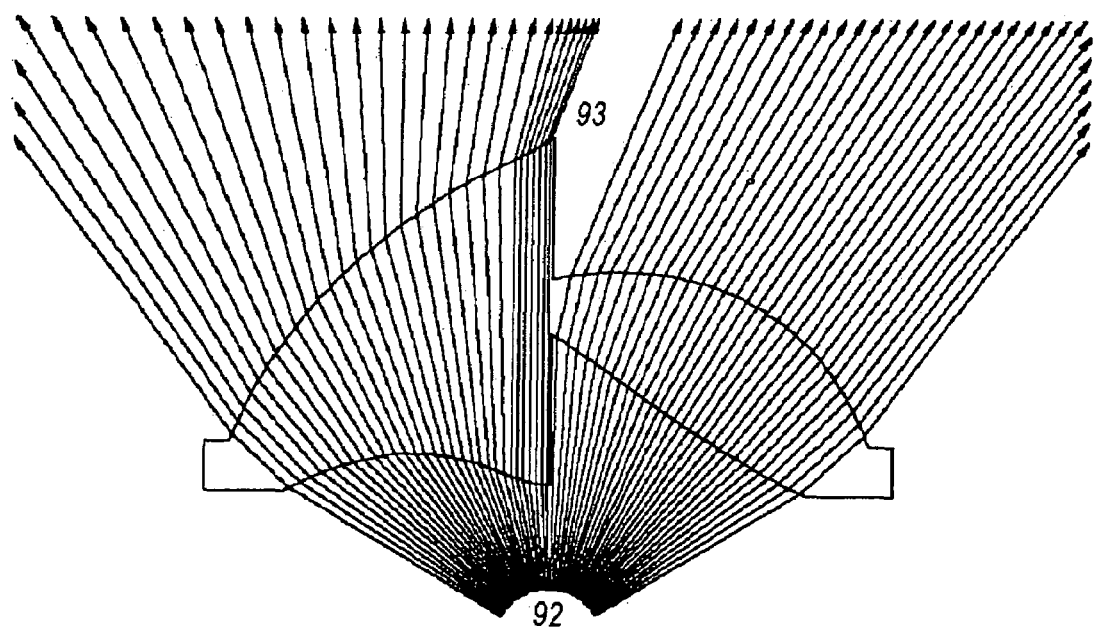
FIG. 9B

CYLINDRICAL IRRADIANCE-MAPPING LENS AND ITS APPLICATIONS TO LED SHELF-LIGHTING

This application incorporates provisional application Ser. No. 60/646,617, filed Jan. 26, 2005.

BACKGROUND OF THE INVENTION

A prominent means of lighting long store-shelves is the fluorescent lamp, due to its low cost and good luminous efficacy. While the linear geometry of this lamp is appropriate for long shelves, its isotropic radiation pattern is not, because most of the light misses the target, unless bulky and expensive reflectors are employed. Also, the light that does make it to the shelf is not at all uniform.

As their prices continue to fall, linear arrays of light-emitting diodes (LEDs) are becoming a viable alternative to fluorescent lamps, due to their longer life and greater compactness. Because LEDs radiate into a hemisphere (or less), optical lensing can be employed to distribute their light output. Such optics can be mounted individually on the LEDs, typically as domes. The prior art is deficient, however, in providing linear lenses for long arrays of LEDs. Linear, or cylindrical lenses, are preferred for linear arrays because of the low cost of extruding the lenses in a transparent plastic such as acrylic.

Low-cost LEDs can be economically provided on low-voltage tapes, spaced every 10-20 mm, such as those sold by the Osram Corporation under the 'Linear Flex' product line. Provision as tape reels enable automated production to install lengths of such LED tapes into long extruded brackets, onto which long extruded lenses can be mounted over the tape's line of LEDs. Extruded lenses, with their constant cross section, fall in the province of cylindrical lenses, also known as rod lenses, but the prior art thereof has been concerned more with imaging than with illumination, particularly in such devices as scanners and copiers.

Thus there is a need for cylindrical lenses designed for illumination by LEDs, particularly designs that will produce uniform illumination on nearby flat surfaces.

The present invention will remedy the current lack of suitable optics for uniform-illuminance LED shelf-lights, and in particular will provide numerous preferred embodiments for different illumination geometries.

SUMMARY OF THE INVENTION

The present invention relates generally to illumination lenses that produce uniform output-illuminance from a linear array of light sources such as LEDs. In particular, the present invention discloses several LED linear lenses providing marked improvements over the LEDs by themselves. These constant-cross-section lenses can be extruded inexpensively and cut to fit particular applications.

Illumination lenses act to collect light from a source and gather it into a useful beam to cast upon a target. Frequently, uniform illumination is desired, but most often not attained. Sometimes this is because the target, such as a wide shelf, has widely varying distance and slant to the luminaire, so that even uniform intensity becomes non-uniform illumination. Thus it is necessary to tailor the intensity for uniform illumination, i.e., intensity must be increased towards the more distant parts of the target, relative to the closest parts. This form of tailoring has principally been applied to circularly symmetric lenses individually mounted on each LED. Cylindrical lenses, however, are inherently more suitable for linear arrays of LEDs because they are far less costly to produce and install. Extrusion of plastic is far less costly than injection molding, and a single long lens is far less costly to mount and align than numerous individual lenses.

Linear lenses, however, are inherently difficult to tailor because they must deal with out-of-plane rays, i.e., rays not lying in the plane of the lens profile. These are called sagittal rays, while the in-plane rays are called meridional rays. Sagittal rays can behave differently from meridional rays because refraction is non-linear for large deflection angles, i.e., over 10°. Thus the sagittal rays are refracted more than the meridional rays, and the image of a line source is a curve, not a line, which complicates the lateral flux-control necessary for uniform illumination. The ends of such a curve bend inwards towards smaller off-axis angles, tending to increase the center of the distribution at the expense of the periphery. In such a case the present invention includes a way to adjust for these crossover terms, by repeating the lens iteration with inputs altered in a feedback way to adjust for departures from uniformity.

Such flux control begins with the angular shape of source's light output. The LEDs on the above-mentioned Osram tapes are specified as having only small emission past 60° from the tape's surface normal, as well as Lambertian emission at lesser angles. This is advantageous in that it greatly reduces overall sagittal range of the rays, and also in that it allows essentially all its flux to be intercepted by compact wide-angle lenses. For example, the above-mentioned LED tape has a 14 mm pitch, with 2.2 mm diameter emitting regions spaced thusly at the top of 2.2 mm high packages. Preferred embodiments described and depicted herein have a width of only 13 mm, and the tops of the various preferred linear-lens embodiments of that width have heights ranging from 9-12 mm above the tape surface. This height variation is for different target widths at a standard 1 foot distance over target-center.

The performance of the various lenses is to be compared with that of the tape alone. Positioned 1' over target center, the tape produces 20 ft-candles just below it and only xx ft-c 6" to the side. A uniform illuminance is preferred across a range of target widths and orientations, as will be described below.

This sagittal-error effect, however, is significant only for lenses requiring large ray-deflections, i.e., those illuminating at f/1, or a 1' target at 1' distance. These will be shown to be designed with an augmented version of the method used to design wide angle lenses, such as a 2' shelf. Illumination of nearby wide shelves is a wide-angle task not involving large ray-deflections, enabling uniform illumination to be attained with a linear calculation that proceeds from the edge of the lens and derives the slope angles that prescriptively refract central source-rays. The LED diameter of 2.2 mm is sufficiently small relative to the 13 mm lens width as to allow such a linear approximation.

Numerous embodiments will be disclosed herein for a variety of everyday illumination tasks, as well as the algorithm that generated them. Shelf lighting, cove lighting, sign lighting, and strip lighting will all find productive application for the present invention. As a product it will have few parts and be easy to install as long continuous runs.

These and other objects and advantages of the invention, as well as the details of an illustrative embodiment, will be more fully understood from the following specification and drawings, in which:

DRAWING DESCRIPTION

FIG. 9A shows an asymmetric linear lens for illuminating a 1 meter shelf from 1' above its edge;

FIG. 9B shows same with rays; and

DETAILED DESCRIPTION

Figure 1A:
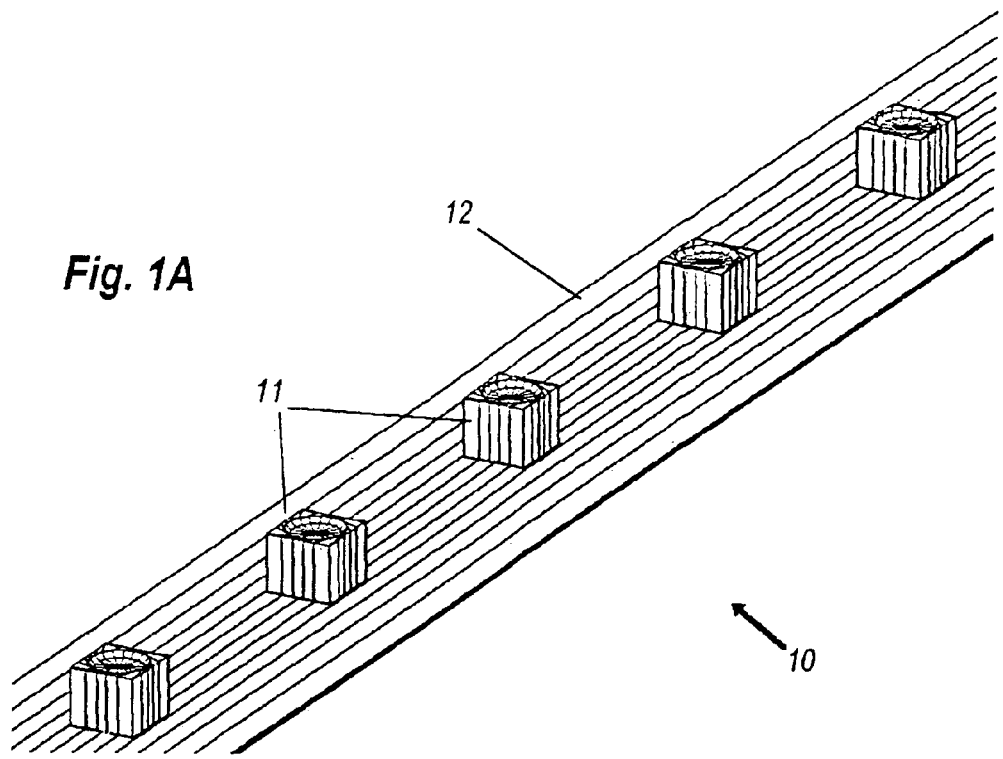
FIG. 1A is a view of a schematic linear array of tape-mounted LEDs.
Figure 1B:
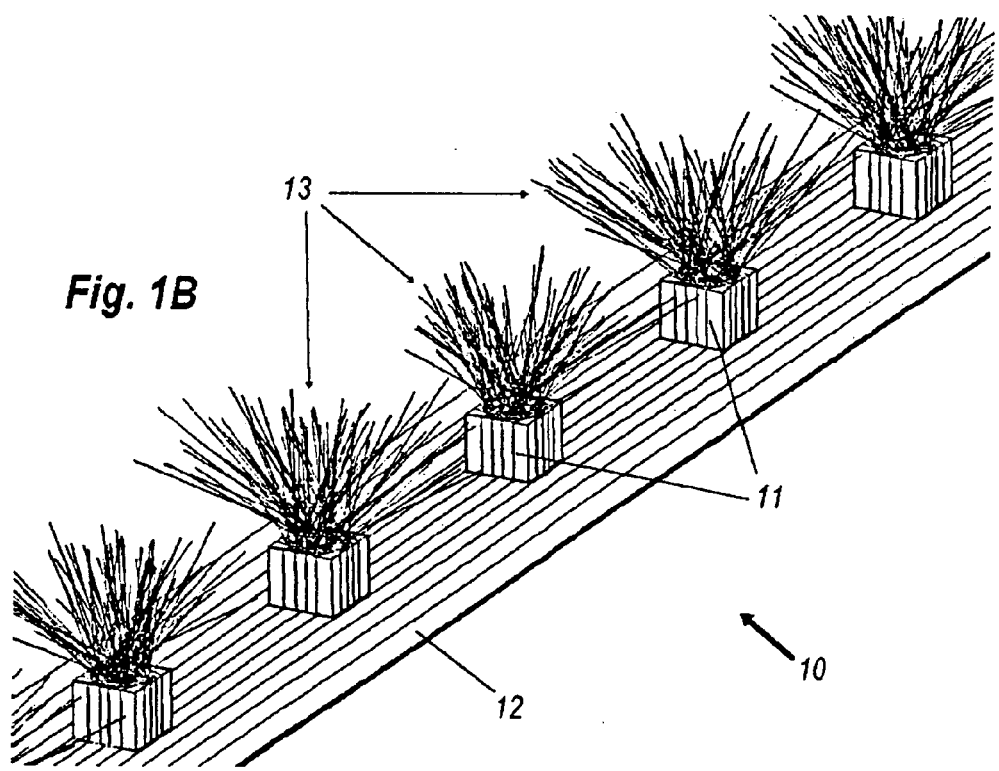
FIG. 1B shows same with Monte Carlo rays used for design validation.

A Lambertian light source presents constant luminance at all viewing angles, so that off-axis foreshortening of its flat output aperture gives a cosine dependence of intensity. FIG. 1 shows a schematic of LED tape system 10 with LEDs 11 on thin electrified tape 12. FIG. 1B shows same but also with short Monte Carlo ray-segments 13.

Figure 1C:
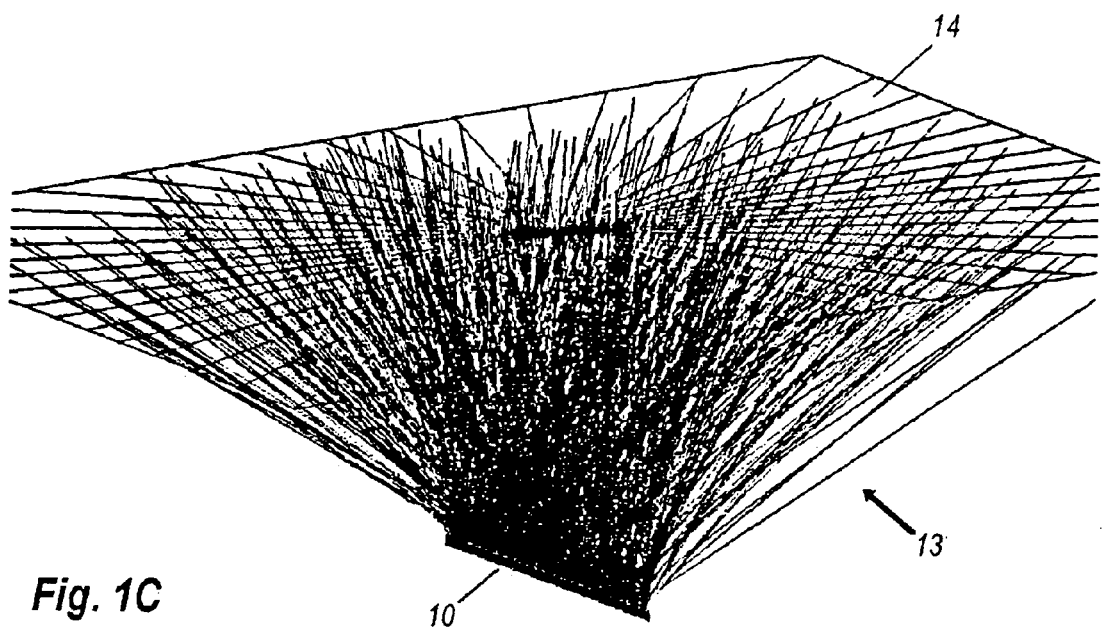
FIG. 1C is the same, but viewed from farther away to show rays hitting a target 1' above the LED tape.

FIG. 1C shows tape system 10 emitting rays 13 that propagate out to target 14 at 1' distance.

Figure 1D:
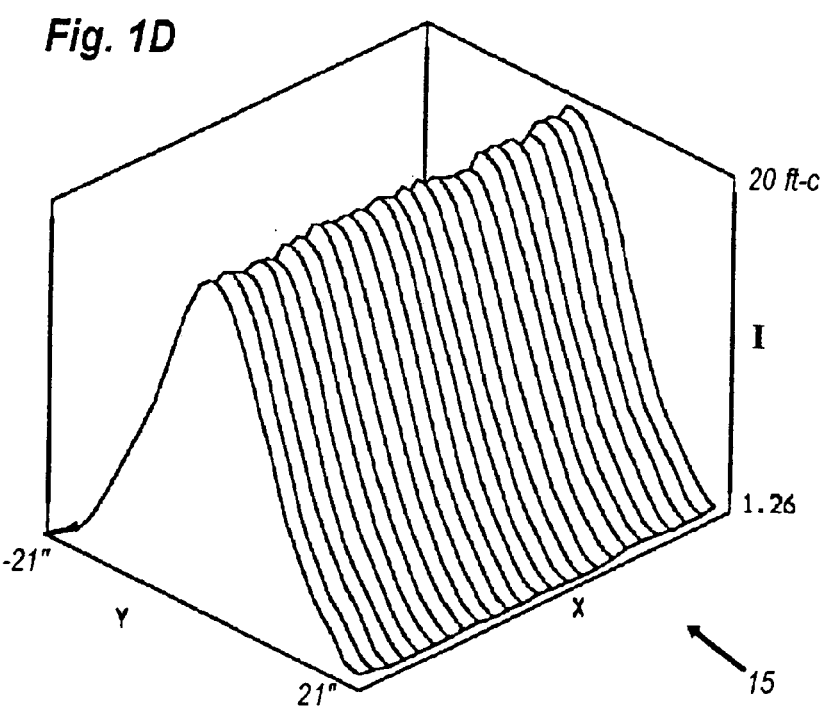
FIG. 1D is a graph of the highly nonuniform lateral distribution of target illuminance, assuming 1 cm spacing and 1 lumen per LED (for the sake of normalization)

FIG. 1D shows 3-D illuminance plot 16 with height showing illuminance I in foot-candles across transverse dimension y of a target 1' from the tape. As can be seen, illuminance has a central peak of 20 ft-c but is very dim at the edge, where incidence angle is 60°. Remedying this extreme nonuniformity is the object of the present invention.

Usually the intensity distribution of LEDs is given as a function of off-axis angle $\theta$, with a circular distribution implicit. In the linear-lens case, however, the lateral off-axis angle a is for a long parallel strip subtending 1° a nominal distance above the LED, on the bottom of the linear lens to be designed. Unlike for fully Lambertian LEDs, these have emission limited to 60°. The lens will be designed to redistribute the radiation on these strips so as to uniformly illuminate the target.

Figure 2A:
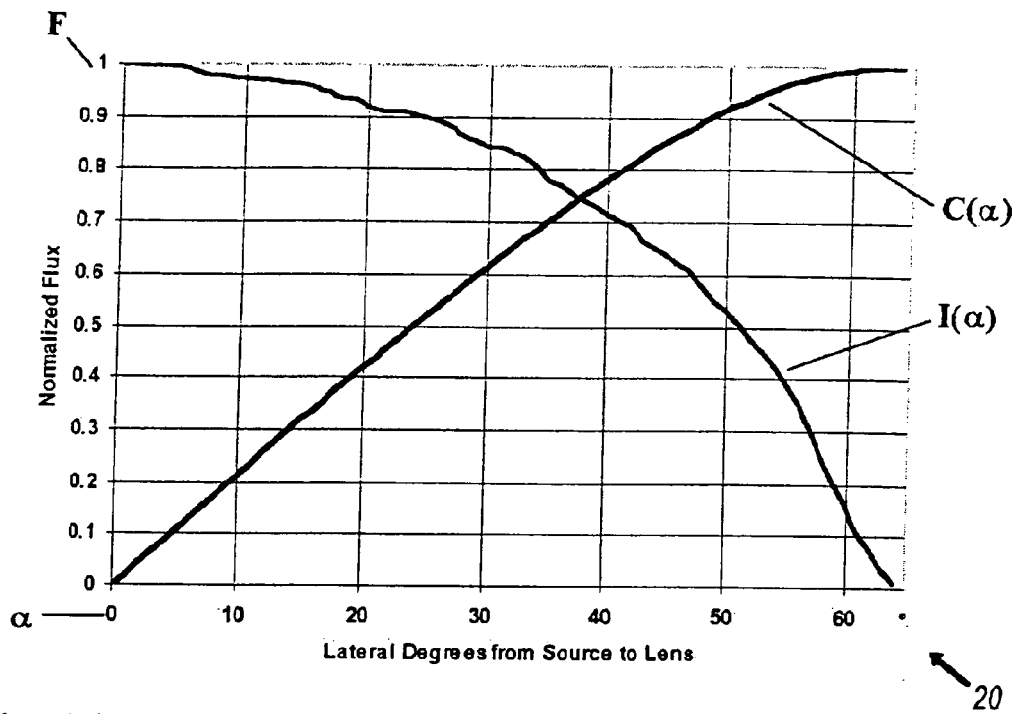
FIG. 2A is a graph of the angular distribution of light from the tape.

FIG. 2A is a graph of normalized flux for this geometry, with abscissa a the transverse angle from the LED. Ordinate F ranges from 0 to 1. Illuminance $I(\alpha)$ is seen to fall off strongly, disappearing at 64°, slightly past the LED's 60° limit due to its finite size at the bottom of the lens. Its irregularity is that of the Monte Carlo simulation that provided the data. Cumulative flux $C(\alpha) = \int_0^\alpha I(\psi)\sin\psi d\psi / \int_0^{90} I(\psi)\sin\psi d\psi$ is shown increasing monotonically. Designing the lens involves matching this function with a like one for the target illuminance.

Figure 2B:
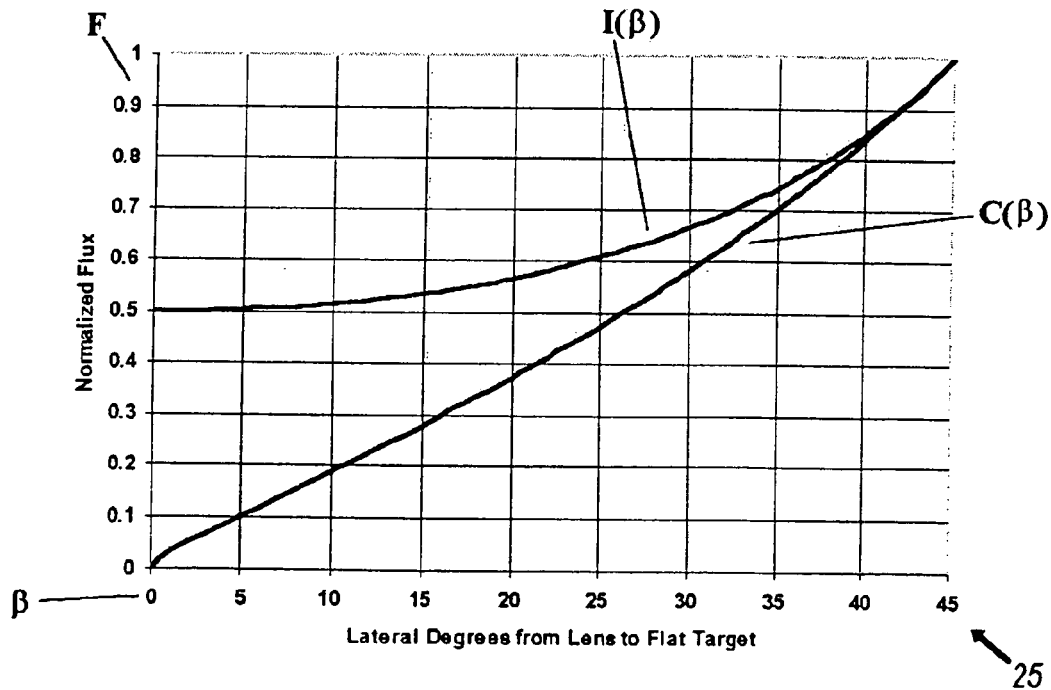
FIG. 2B is the corresponding graph of the angular distribution of light to a target.

FIG. 2B shows similar graph 25, but with abscissa $\beta$, the transverse angle from lens to target, which subtends ±45°. Intensity $I(\beta)$ equals $\cos^{-2}\beta$, which gives uniform illuminance on target. The cumulative flux $C(\beta)$ is also shown. At any particular LED-exit angle $\alpha$, the particular value of $C(\alpha)$ gives a corresponding $\beta(\alpha)$ via the flux-matching condition $C(\beta)=C(\alpha)$. The lens must deflect every central ray from $\alpha$ to $\beta$. The small-source approximation limits lens size to about 6-7 times emitter width. Thus the lenses shown here have a 13 mm aperture, given the 2.2 mm emitter diameter on the LEDs.

Designing the upper and lower profiles of a cylindrical irradiance redistribution lens begins with the assumption that the two surfaces equally share the total deflection $\alpha$-$\beta$, since aberrations are non-linear. This does not preclude slight shape variations from those shown herein, in order to one surface-profile (usually the bottom) to assume a convenient shape, such as a flat or a circle. Nor are precluded an other "nearby" shapes derived by curve-fitting the numerically derived surfaces disclosed herein. That is, it may be convenient to sacrifice a little uniformity for a particular surface-profile to be attained, perhaps for manufacturing convenience.

The ideal lens profiles depicted herein are generated by a differential equation relating the bottom-surface coordinates to the slope angle of the bottom surface, via the bottom-surface deflection angle $\frac{1}{2}(\alpha-\beta)$.

Figure 3A:
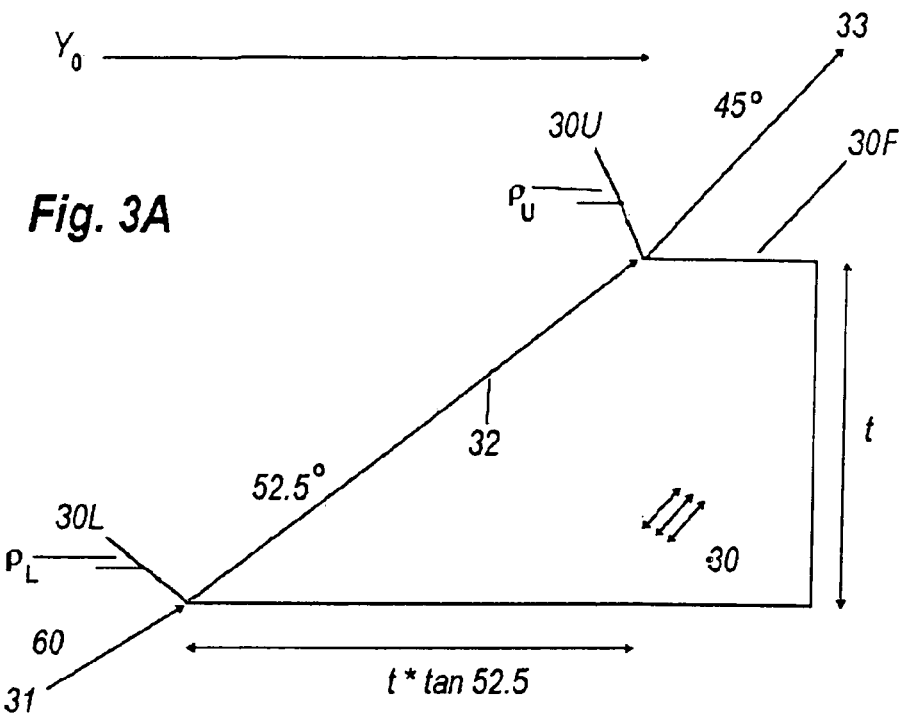
FIG. 3A is a cross-section of a ±45° lens positioned above LED and tape.

Given this deflection function $\beta(\alpha)$ from the cumulative-flux data, the lens profile can be calculated by the method of FIG. 3A, which is a close-up view of the edge of irradiance-redistribution lens 30, in the vicinity of flange 30F, showing lower surface profile 30L and upper surface profile 30U. The mathematical generation of lower surface 30L begins with its outer edge, where extreme central ray 31 defines $\alpha=60°$. Lower surface 30L has slope $\rho_L$, which refracts ray 31 into internal ray 32, defining $\theta=52.5°$. Upper surface 30U has slope $\rho_U$, which refracts ray 32 into external ray 33, defining $\beta=45°$.

Figure 3B:
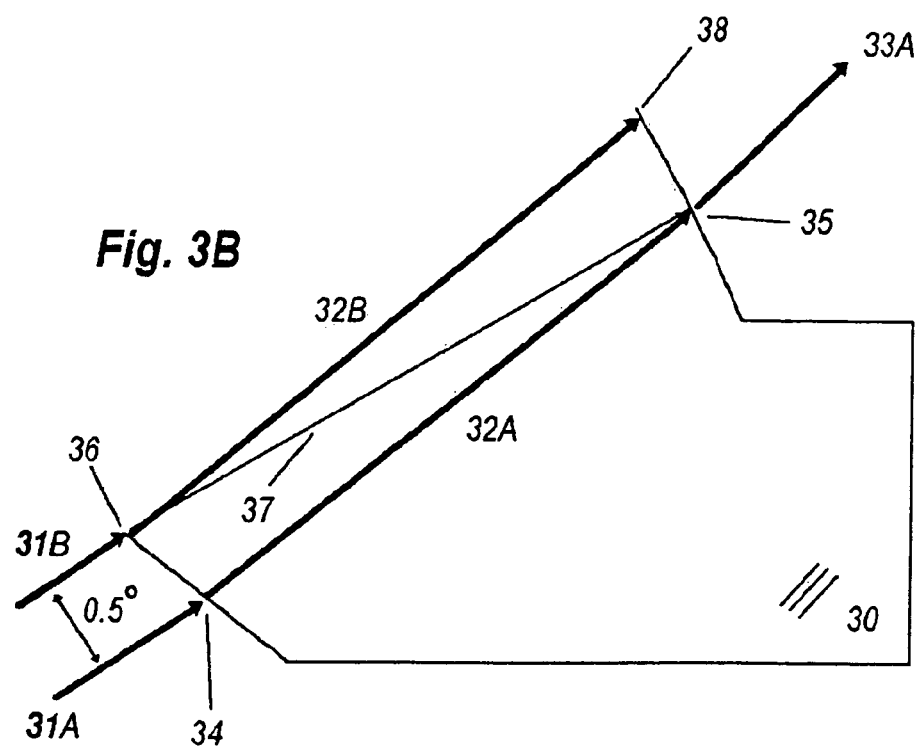
FIG. 3B shows same with central rays.

FIG. 3B shows lens profile 30, with previously calculated lower-surface point 34 and corresponding central ray 31A. Central ray 31B is 0.5° inside ray 31A, enabling next lower-surface point 36 to be calculated by the law of sines and the triangle formed by the origin (not shown) and points 34 & 36.

Internal ray 32B has known inclination $\theta=\frac{1}{2}(\alpha+\beta(a))$. Once point 36 is located, its distance from known point 36 is indicated by line-segment 37. Then point 38 can be located by the law of sines applied to the triangle it forms with points 35 & 36.

Figure 4A:
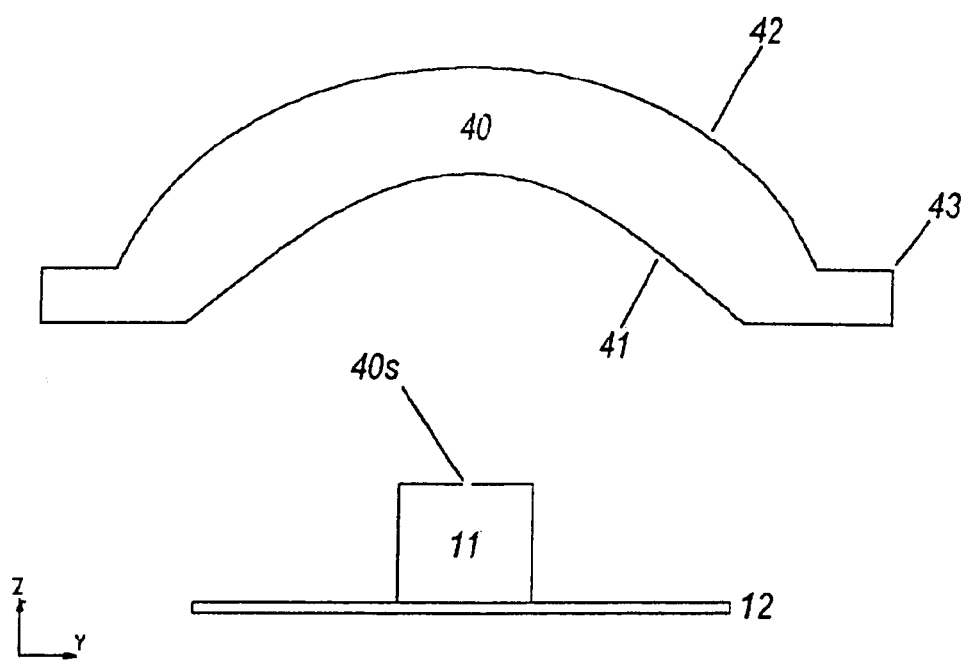
FIG. 4A is an external view of a complete linear-lens installation.

By using small intervals, smooth upper and lower surfaces can thus be mathematically iterated from the periphery to the center, with different resultant shapes dependent upon the size and distance of the illumination target. FIG. 4A shows the result of continuing the lens-iteration process illustrated by FIG. 3B. Lens profile 40 comprises lower concave surface 41, upper convex surface 42, and flange 43. The lens is positioned relative to point 40s at the center of the emitting top of LED 11, mounted on tape 12. Planar ray-fan 44 subtends ±60° and is refracted into exiting fan 45, subtending ±45° and flux-distributed via the above-discussed function β(α) so as to provide uniform target illumination.

Figure 4B:
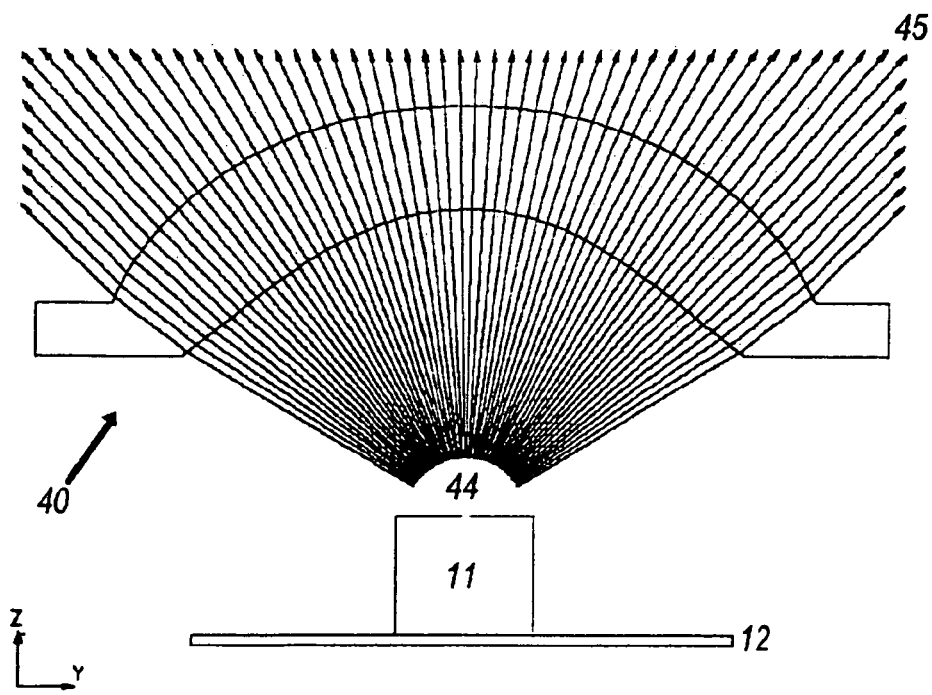
FIG. 4B shows same illuminating its 2' target from 1' above its center.
Figure 4C:
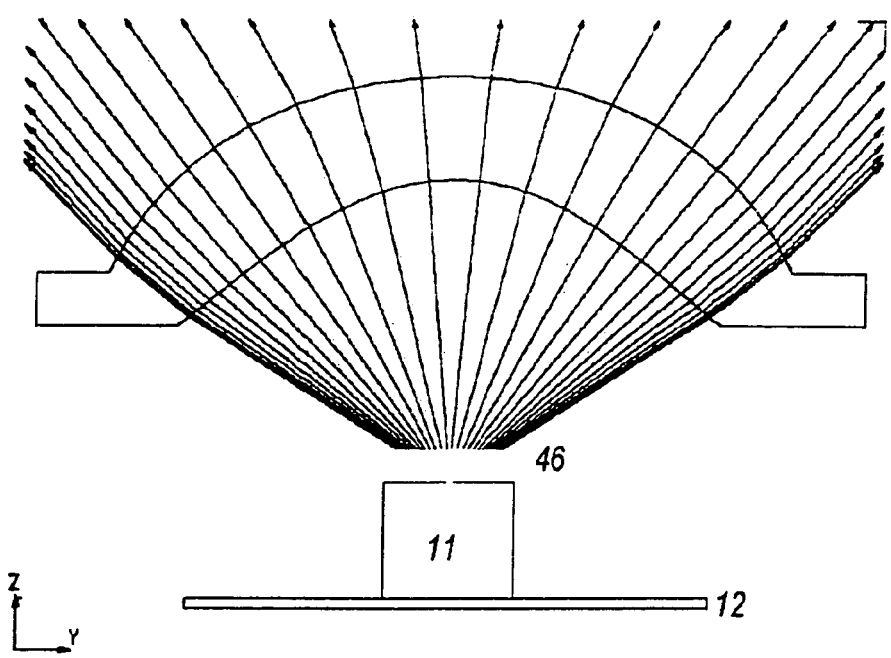
FIG. 4C shows same with a cone of 60° rays.

Since the largest single-surface deflection by this lens is only 7.5°, the sagittal error is small. FIG. 4C shows lens profile 40, and ray-cone 46 of 60° extreme central rays from LED 11. Their deflections differ little from those of planar rays in FIG. 4B.

Figure 4D:
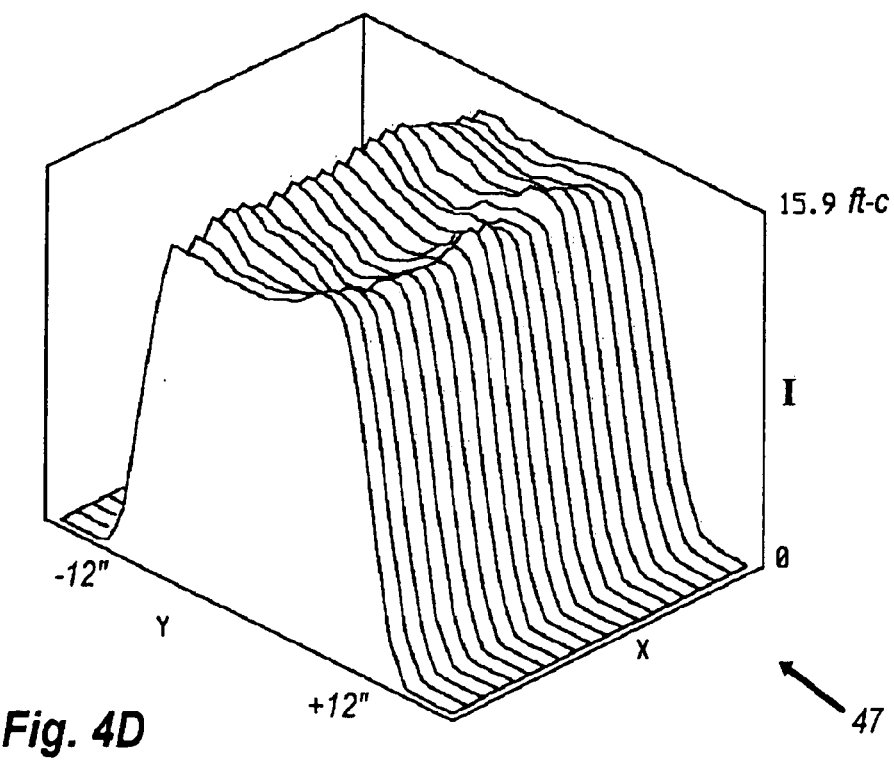
FIG. 4D shows the resulting target illuminance distribution, to be compared with FIG. 1D.

FIG. 4D shows 3D graph 47 of target illuminance, showing a very uniform 16 ft-c across the 2' span of the target, with a tight drop-off beyond it. Note the large difference from FIG. 1D of the bare LEDs.

Figure 5A:
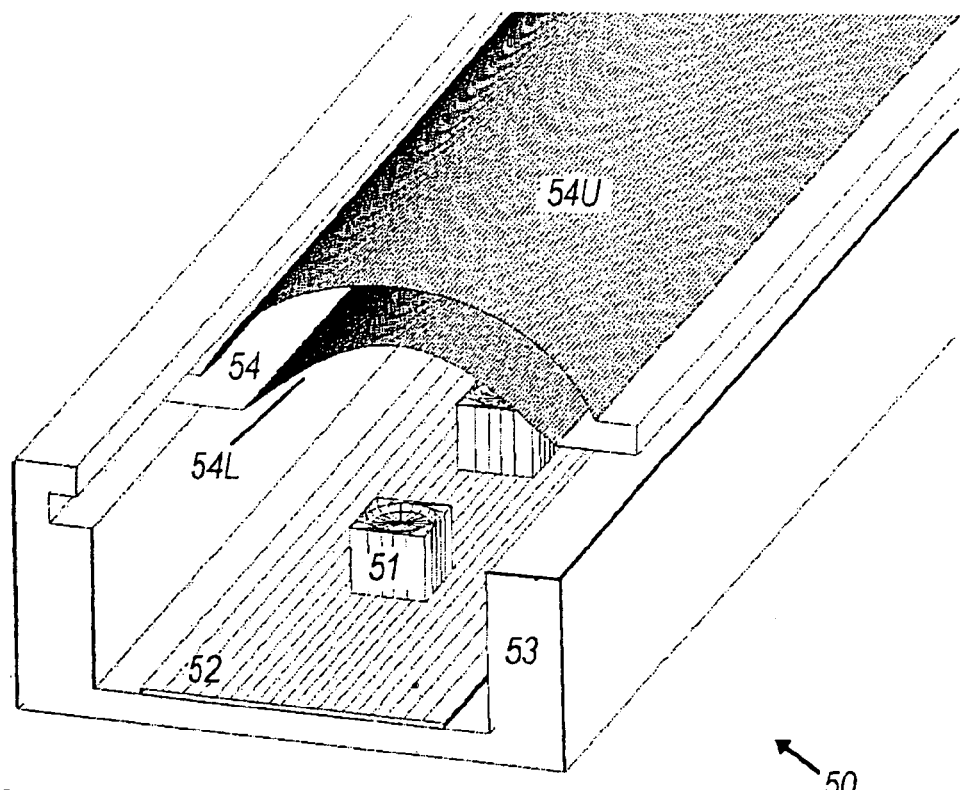
FIG. 5A shows the first step in calculating the lens profile.

FIG. 5A shows linear lighting system 50 comprising LEDs 51, tape 52, extruded bracket 53 (cutaway on right), and linear lens 54. Lower surface 54L is visible below upper surface 54U. It can be seen that this lens has small but crucial thickness variation, quite unlike conventional rod lenses.

Figure 5B:
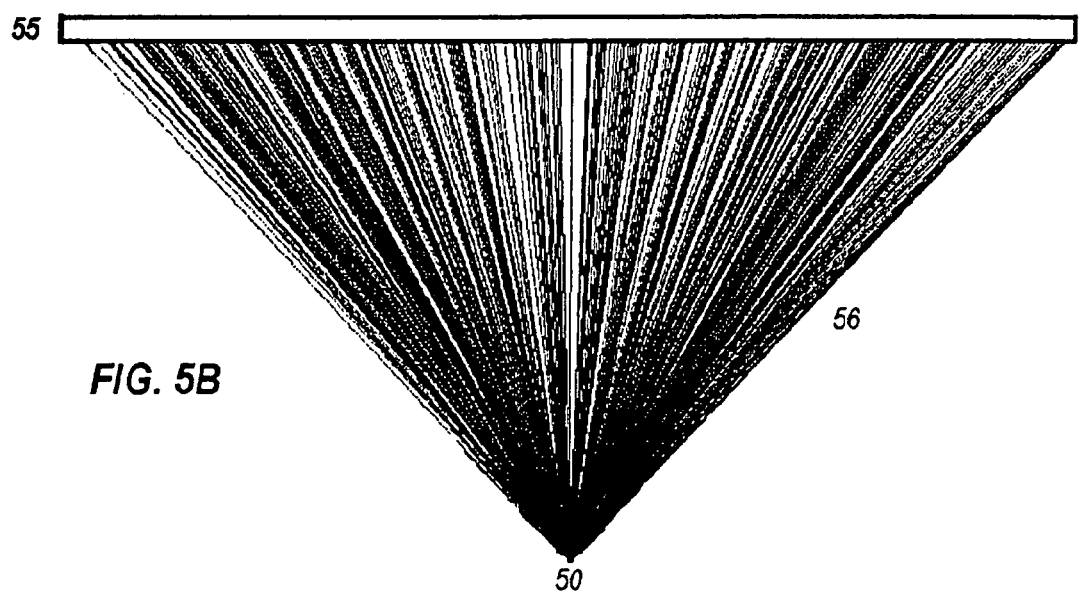
FIG. 5B shows how each subsequent step follows the previous one.

FIG. 5B shows system 50 in action, illuminating target 55 with irradiance-mapped rays 56.

Figure 6A:
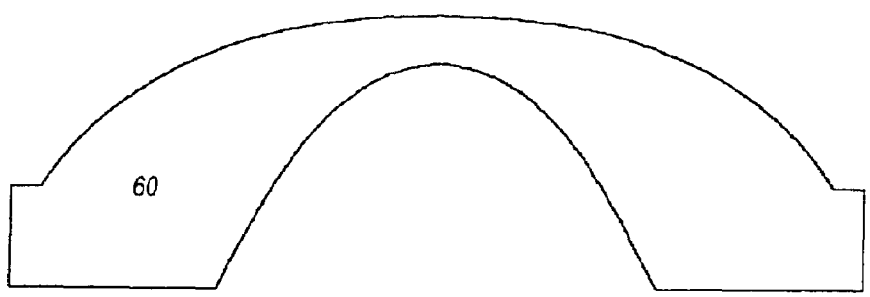
FIG. 6A shows the cross-section of a thinner, wider-angle linear lens that illuminates a 1 meter wide shelf from 1' above its center.

Other illumination situations can be addressed with equal facility. FIG. 6A shows the unconventional-looking cross-section of cylindrical lens 60, positioned above LED 61.

Figure 6B:
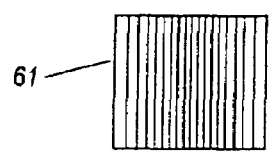
FIG. 6B shows same with central rays.
Figure 6B:
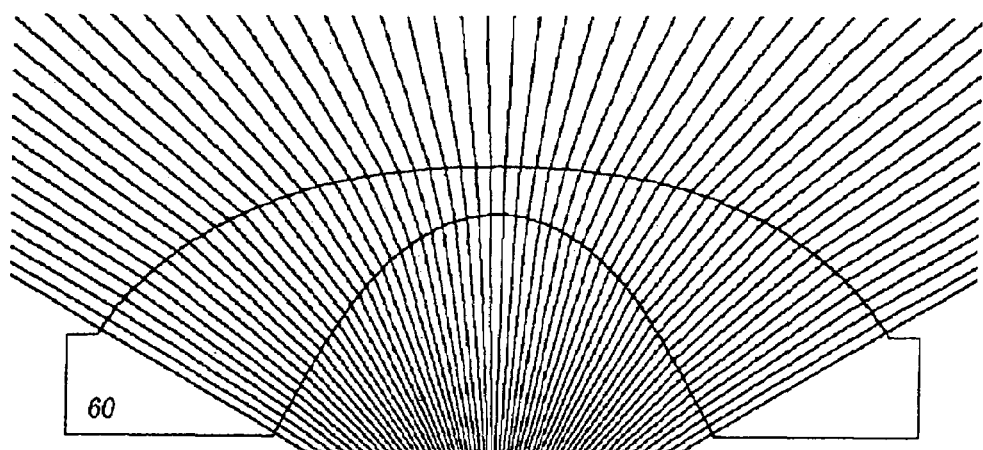
Figure 6C:
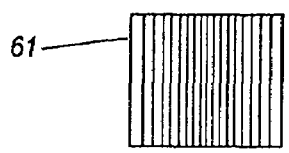
FIG. 6C shows same illuminating target.
Figure 6C:
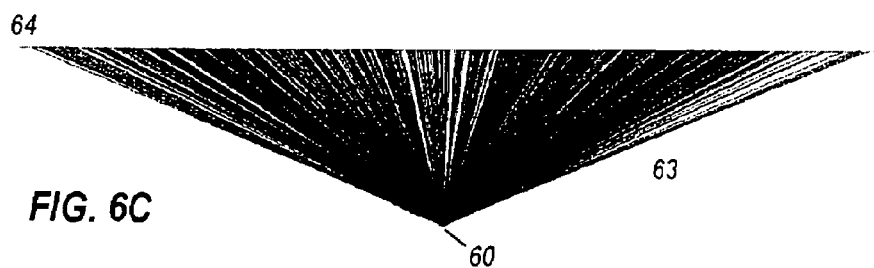

FIG. 6B also shows planar ray-fan 62, with extreme ray 62E passing undeflected through the system. Most other rays are deflected outwards, making this a negative lens. Its wide-angle illumination action is shown in FIG. 6C, showing the lens at 60 emitting rays 63 on target 64, which is 1 meter wide at 1 foot above the light at point 60.

Figure 7A:
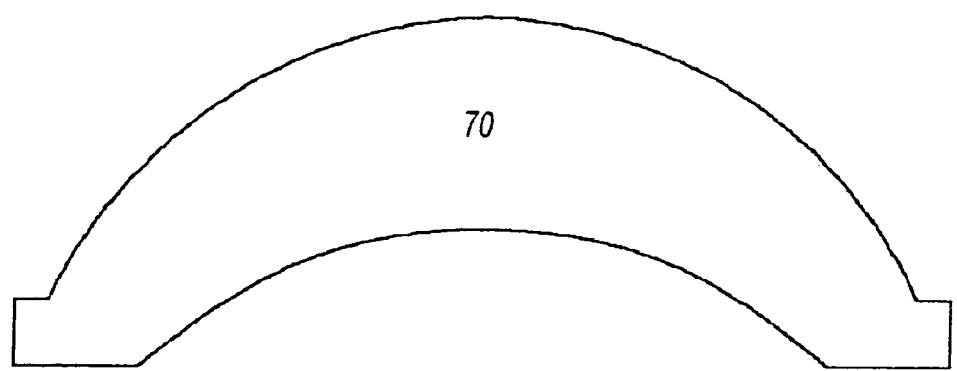
FIG. 7A shows a cross-section of a lens for illuminating a corner strip.
Figure 7B:
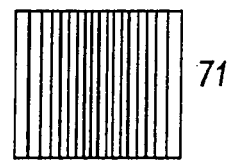
FIG. 7B shows said illumination.
Figure 7B:
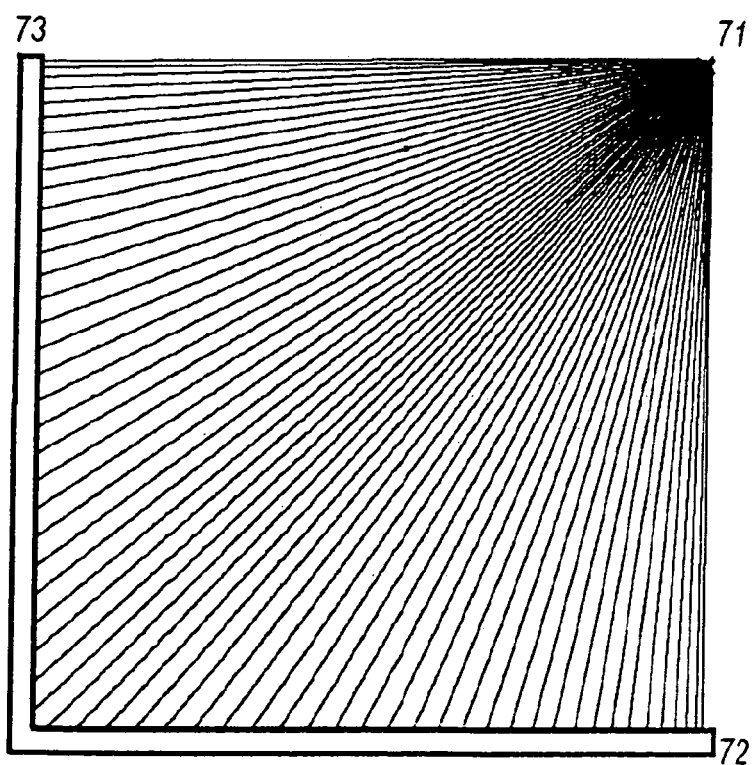

FIG. 7A shows the cross-section of linear lens 70, resembling lens 40 of FIG. 4A in that it has ±45° output, but distributed differently. FIG. 7B shows lens and LED 71 in a corner position and tilted 45°, uniformly illuminating perpendicular corner-walls 72 & 73.

Figure 8A:
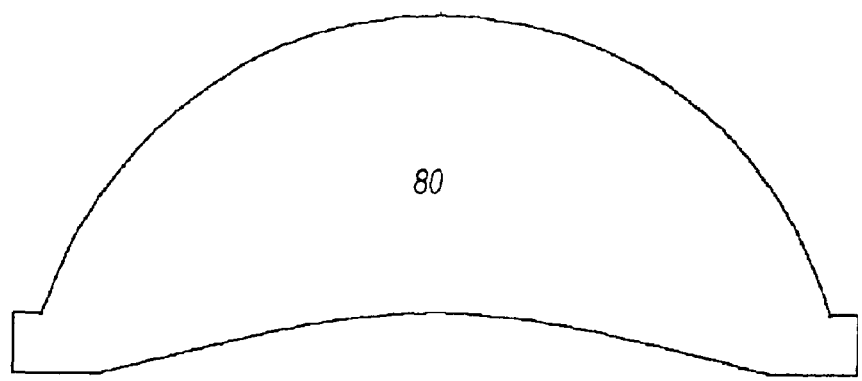
FIG. 8A shows a narrow-angle linear lens for illuminating a 1' shelf from 1' above its center.
Figure 8A:
Figure 8A:
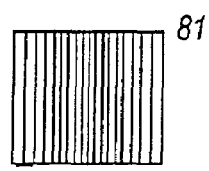
Figure 8B:
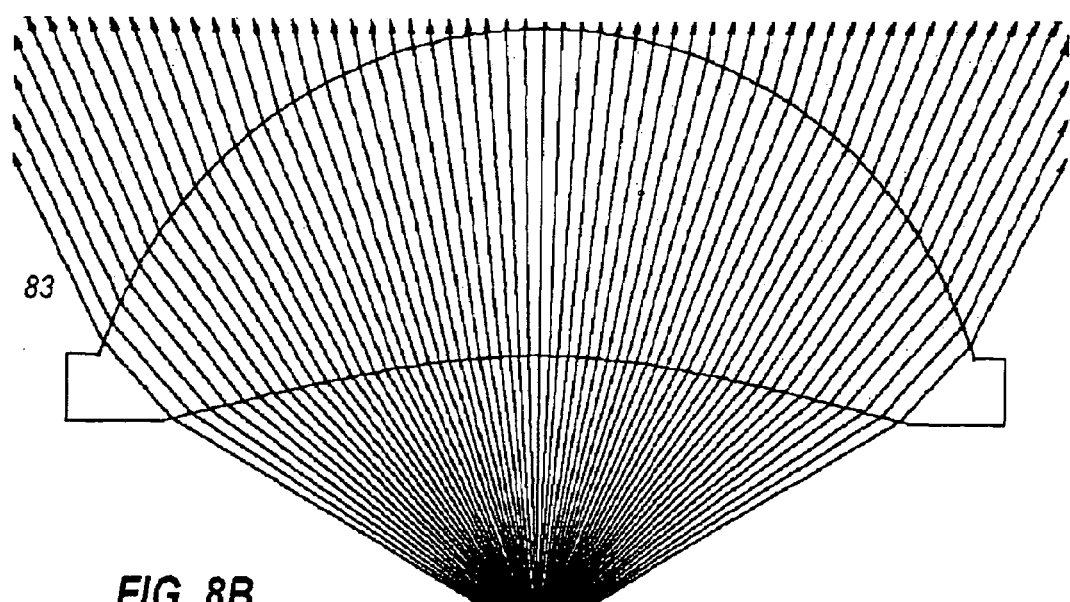
FIG. 8B shows same with rays.
Figure 8B:
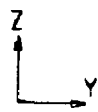
Figure 8B:
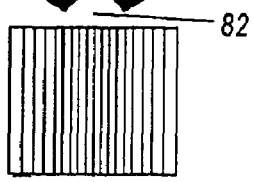

FIG. 8A shows the cross-section of a thicker, narrower-angle (f/1) linear lens 80 positioned above LED 81. FIG. 8B shows planar ray-fan 82 being refracted into ±26° output fan 83, distributed to uniformly illuminate a 1' shelf from 1' distance over its center. Sagittal error causes some light to "leak" to smaller values of β, requiring a slight modification to the β(α) function.

Circularly-symmetric lenses are necessarily left-right symmetric, but linear lenses are not. In fact, the present invention includes preferred embodiments of asymmetric linear lenses for asymmetric illumination geometries. The above-mentioned 1', 2', and 1 meter targets at 1' distances can as easily be illuminated from one edge as the above-disclosed lenses do from over the center of the target.

Figure 9C:
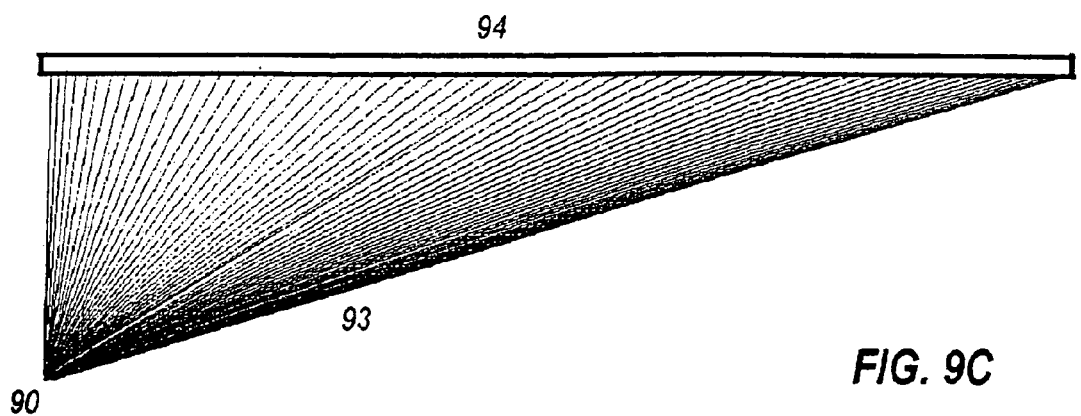
FIG. 9C shows same illuminating a 1 m wide shelf from 1' over its edge.

FIG. 9A shows asymmetric illumination lens 90 positioned over LED 91. Lens 90 has two quite dissimilar halves 90L and 90R. The coordinated action of these two halves can be seen in FIG. 9B, showing the refractive deflection by lens 90 of planar ray-fan 92, transforming it into asymmetric output fan 93. FIG. 9C shows lens 90 illuminating 1-meter-wide target 94 from 1' above one edge, with output ray-fan 92.

The only mathematical difference is that the angles α and β can now take negative values, with β=θ−36.5, and θ=atan (y/H), with lateral coordinate y measured from beneath the source at height H.

FIG. 5B shows an illuminated wall 55 intercepting LED light redistributed by the FIG. 5A lens, the wall extending lengthwise in a direction generally parallel to the line of LEDs.

We claim:

1. A cylindrical irradiance-redistribution lens is positioned over a line of LEDs, and in combination therewith, the lens configured to redistribute multiple LED light for uniformly illuminating a nearby substantially planar target, and wherein the lens is elongated and has cross sections along lens length characterized by:
   i) a central upper convex surface dome,
   ii) a central lower concave surface dome, under the upper surface dome,
   iii) said domes angled downwardly and transversely to terminate at two flanges projecting oppositely,
   iv) the lower surface of each flange intersecting the lower surface dome at a locus beneath the upper surface dome, said locus defining the periphery of the lower surface dome, the lower surface dome everywhere facing away from the upper surface dome.

2. The combination of claim 1 wherein the LEDs in said lens having cumulative lateral flux function or functions, and the lens shape being calculated for matching said cumulative lateral flux function or functions of the line of LEDs with that of the uniformity illuminated planar target, the lens being elongated to bridge multiple LEDs.

3. The combination of claim 1 including a tape supporting the line of LEDs extending parallel to said planar target in the form of a shelf, sign, or wall.

4. The combination of claim 3 including circuitry on or along the tape for electrically energizing the LEDs.

5. The combination of claim 1 wherein the lens has an aperture that is between about 6 to 7 times the emitter diameter for each LED.

6. The combination of claim 1 wherein light rays from each LED intercept substantially all surface extents of the domes.

7. The combination of claim 1 including a tape supporting the LEDs and spaced below said dome surfaces.

8. The combination of claim 7 including an elongated support, supporting the flanges and supporting the tape whereby light rays from each LED intercept substantially all surface extents of the domes.

9. The combination of claim 1 including an illuminated wall or walls intercepting LED light that has been redistributed by the lens, the wall extending lengthwise in a direction generally parallel to said line of LEDs.

10. The combination of claim 9 wherein the wall or walls form an illuminated corner.

11. The combination of claim 1 wherein the LEDs are positioned below the domes at loci characterized in that light flux from the LEDs forms a ray-fan subtending about 60° said ray-fan directly extending uninterruptedly to said lower surface dome.

12. The combination of claim 11 wherein the ray-fan is refracted by the lens to exit from the upper dome to subtend about 45°.

13. The combination of claim 1 including a support for the LEDs which are positioned below the lens lower surface such that the ray-fan exiting the lens subtends the surface of the planar target, with substantially uniform illumination thereof.

14. The combination of claim 1 wherein the lens is asymmetric.

15. In combination, a cylindrical lens structure in combination with a series of LEDs and a flat target surface proximate the lens to receive illumination from the LEDs, and the lens configured to produce substantially uniform illumination on and over the area of said flat surface proximate said lens, the lens having
- i) a central upper convex surface dome,
- ii) a central lower concave surface dome, under the upper surface dome,
- iii) said domes angled downwardly and transversely to terminate at two flanges projecting oppositely,
- iv) the lower surface of each flange intersecting the lower surface dome at a locus beneath the upper surface dome, said locus defining the periphery of the lower surface dome, the lower surface dome everywhere facing away from the upper surface dome.

16. The combination of claim 15 wherein the lens extends linearly, and the LEDs are spaced apart linearly.

17. The combination of claim 15 including a tape supporting the LEDs and via which electrical energy is supplied to the LEDs.

18. The combination of claim 15 wherein the lens defines dome shaped regions projecting away from the series of LEDs.

\* \* \* \* \*